US012610316B2

(12) United States Patent
Chu et al.

(10) Patent No.: US 12,610,316 B2
(45) Date of Patent: Apr. 21, 2026

(54) LOW POWER LISTENING MODE FOR STATIONS OF A WIRELESS NETWORK

(71) Applicant: NXP USA, Inc., Austin, TX (US)

(72) Inventors: Liwen Chu, San Ramon, CA (US); Rui Cao, Sunnyvale, CA (US); Kiseon Ryu, San Diego, CA (US); Hongyuan Zhang, Fremont, CA (US); Huizhao Wang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 365 days.

(21) Appl. No.: 18/385,327

(22) Filed: Oct. 30, 2023

(65) Prior Publication Data

US 2024/0147363 A1    May 2, 2024

Related U.S. Application Data

(60) Provisional application No. 63/476,247, filed on Dec. 20, 2022, provisional application No. 63/381,296, filed on Oct. 28, 2022.

(51) Int. Cl.
*H04W 52/02* (2009.01)
*H04W 84/12* (2009.01)

(52) U.S. Cl.
CPC ........ *H04W 52/0229* (2013.01); *H04W 84/12* (2013.01)

(58) Field of Classification Search
None
See application file for complete search history.

(56) References Cited

U.S. PATENT DOCUMENTS

| 2016/0360489 | A1* | 12/2016 | Boodannavar | ....... H04B 7/0413 |
| 2020/0275373 | A1* | 8/2020 | Hwang | ............. H04W 52/0235 |
| 2021/0377856 | A1 | 12/2021 | Chu et al. | |
| 2024/0040634 | A1* | 2/2024 | Kim | ..................... H04W 48/14 |
| 2024/0137860 | A1* | 4/2024 | Asterjadhi | ........ H04W 52/0206 |
| 2024/0137982 | A1* | 4/2024 | Chu | ................. H04W 74/0816 |
| 2024/0389023 | A1* | 11/2024 | Chen | ..................... H04W 76/15 |

OTHER PUBLICATIONS

Chen, Xiaogang et al. "Low Power Listening Mode", IEEE 802. 11-22/1414r1, Aug. 31, 2022, 13 pgs.

* cited by examiner

*Primary Examiner* — Anh H Ly

(57) ABSTRACT

A method of a low power listening mode includes announcing, by a first wireless device is operating in a low power listening mode. The first wireless device in the low power listening mode receives an initial frame having a single spatial stream and a low data rate from a second wireless device. The frame requests a frame exchange with the first wireless device. The low data rate is lower than a maximum data rate of the first wireless device. A reply to the initial frame is transmitted to the second wireless device in a single spatial stream with the low data rate. The reply acknowledges an association with the second wireless device. The first wireless device wakes from the low power listening mode to a full capacity mode, and performs a frame exchange with the second wireless device in the full capacity mode.

23 Claims, 8 Drawing Sheets

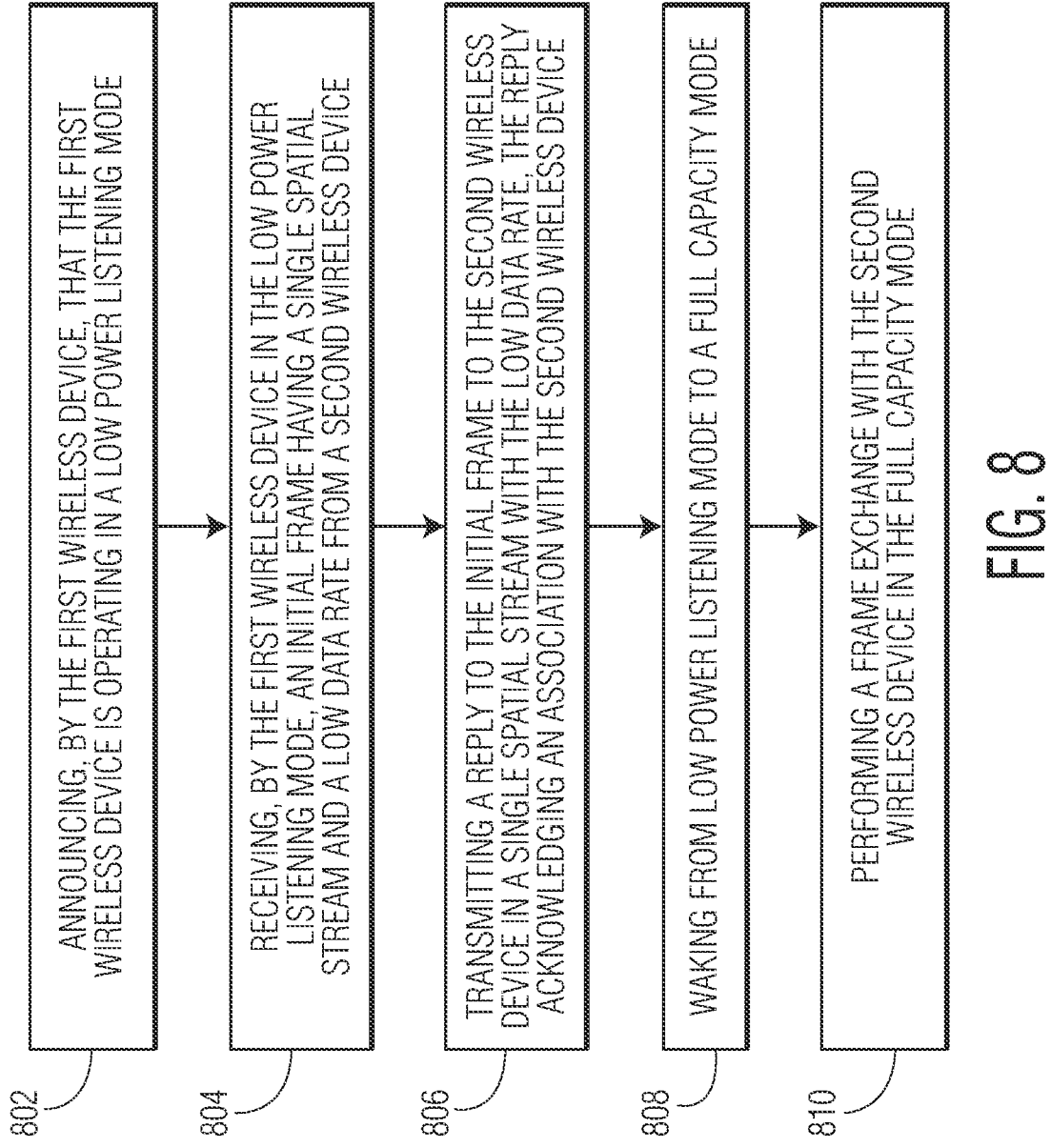

802 ANNOUNCING, BY THE FIRST WIRELESS DEVICE, THAT THE FIRST WIRELESS DEVICE IS OPERATING IN A LOW POWER LISTENING MODE

804 RECEIVING, BY THE FIRST WIRELESS DEVICE IN THE LOW POWER LISTENING MODE, AN INITIAL FRAME HAVING A SINGLE SPATIAL STREAM AND A LOW DATA RATE FROM A SECOND WIRELESS DEVICE

806 TRANSMITTING A REPLY TO THE INITIAL FRAME TO THE SECOND WIRELESS DEVICE IN A SINGLE SPATIAL STREAM WITH THE LOW DATA RATE, THE REPLY ACKNOWLEDGING AN ASSOCIATION WITH THE SECOND WIRELESS DEVICE

808 WAKING FROM LOW POWER LISTENING MODE TO A FULL CAPACITY MODE

810 PERFORMING A FRAME EXCHANGE WITH THE SECOND WIRELESS DEVICE IN THE FULL CAPACITY MODE

FIG. 8

LOW POWER LISTENING MODE FOR STATIONS OF A WIRELESS NETWORK

CROSS-REFERENCE TO RELATED APPLICATIONS

This application is entitled to the benefit of U.S. Provisional patent application Ser. No. 63/381,296, filed on Oct. 28, 2022, and of U.S. Provisional patent application Ser. No. 63/476,247, filed on Dec. 20, 2022, which are incorporated by reference herein.

BACKGROUND

Wireless communications devices, e.g., access points (APs) or non-AP devices transmit various types of information using different transmission techniques. For example, various applications, such as, Internet of Things (IoT) applications conduct wireless local area network (WLAN) communications, for example, based on Institute of Electrical and Electronics Engineers (IEEE) 802.11 family of standards (e.g., Wi-Fi standards). Some applications, for example, video teleconferencing, streaming entertainment, high definition (HD) video surveillance applications, outdoor video sharing applications, etc., require relatively high system throughput. New wider channels and multiple subchannels allow for more data to be transmitted. The new wider channels require more power to operate and so various power consumption techniques have been developed.

SUMMARY

Embodiments of a method and apparatus for wireless communications are disclosed. In an embodiment, a method of a low power listening mode includes announcing, by a first wireless device, that the first wireless device is operating in a low power listening mode. The first wireless device in the low power listening mode receives an initial frame having a single spatial stream and a low data rate from a second wireless device. The frame requests a frame exchange with the first wireless device. The low data rate is lower than a maximum data rate of the first wireless device. A reply to the initial frame is transmitted to the second wireless device in a single spatial stream with the low data rate. The reply acknowledges an association with the second wireless device. The first wireless device wakes from the low power listening mode to a full capacity mode, and performs a frame exchange with the second wireless device in the full capacity mode.

In an embodiment receiving the initial frame comprises receiving the initial frame in the full capacity mode of the first wireless device.

In an embodiment the full capacity mode has an operating bandwidth that comprises a basic service set of a frequency band.

In an embodiment receiving the initial frame comprises receiving the initial frame in a single channel of an operating bandwidth of the first wireless device and wherein transmitting the reply comprises transmitting the reply in the single channel.

In an embodiment the single channel is a 20 MHz channel of a basic service set of a frequency band.

In an embodiment performing a frame exchange comprises transmitting a frame using multiple spatial streams and a high data rate, the high data rate being higher than the low data rate.

In an embodiment receiving the initial frame comprises receiving a non-HT (High Throughput) duplicate PPDU (Physical Layer Protocol Data Unit) of a transmit opportunity in greater than a single 20 MHz channel.

In an embodiment the initial frame comprises a request to send and the reply to the initial frame comprises a clear to send.

An embodiment includes receiving, by the first device in the full capacity mode, a second PPDU having a request to send from the second wireless device, transmitting a reply to the second PPDU to the second wireless device in the full capacity mode having a clear to send.

In an embodiment the initial frame comprises a probe request frame and the reply to the initial frame comprises a probe response frame.

In an embodiment the initial frame comprises a multi-user request to send and the reply to the initial frame comprises a clear to send.

An embodiment includes returning to the low power listening mode after performing the frame exchange.

In an embodiment announcing comprises announcing parameters of the low power listening mode and wherein receiving the initial frame comprises receiving the initial frame in accordance with parameters of the announcement.

An embodiment includes a processor, and a transceiver coupled to the processor, the transceiver to announce that the wireless device is operating in a low power listening mode, to receive, in the low power listening mode, an initial frame having a single spatial stream and a low data rate from a second wireless device, the frame requesting a frame exchange with the wireless device, the low data rate being lower than a maximum data rate of the wireless device; to transmit a reply to the initial frame to the second wireless device in a single spatial stream with the low data rate, the reply acknowledging an association with the second wireless device, the processor to wake the wireless device from the low power listening mode to a full capacity mode, and the transceiver to perform a frame exchange with the second wireless device in the full capacity mode.

In an embodiment the transceiver is to receive the frame in a single channel of an operating bandwidth of the first wireless device and to transmit the reply in the single channel.

In an embodiment a method of power management in a second wireless device includes receiving an announcement, by a first wireless device, that the first wireless device is operating in a low power listening mode, transmitting, by the second wireless device, an initial frame having a single spatial stream and a low data rate to the first wireless device, the frame requesting a frame exchange with the first wireless device, the low data rate being lower than a maximum data rate of the first wireless device, receiving a reply to the initial frame from the first wireless device in a single spatial stream with the low data rate, the reply acknowledging an association with the second wireless device, and performing a frame exchange with the first wireless device in the full capacity mode.

In an embodiment a method of power management in a second wireless device includes receiving from a first wireless device at a second wireless device, an initial frame having a single spatial stream and a low data rate, the second wireless device operating in a low power listening mode, the frame requesting a frame exchange with the second wireless device, the low data rate being lower than a maximum data rate of the second wireless device, switching from the low power listening mode to a full capacity mode, transmitting a reply to the initial frame from the first wireless device in the full capacity mode using a wider bandwidth than received in the low power listening mode, the reply acknowledging an association with the first wireless device, and performing a frame exchange with the first wireless device in the full capacity mode.

In an embodiment receiving the initial frame comprises receiving the initial frame in a non-HT duplicate PPDU and wherein switching comprises switching before the end of the non-HT duplicate PPDU carrying the initial frame.

An embodiment includes the second wireless device indicating a padding requirement to the first wireless device for the second wireless device to switch from the low power listening mode to the full capacity mode and wherein receiving the initial frame comprises receiving the initial frame with padding in response to the indicating the padding requirement.

An embodiment includes receiving a request to send after transmitting the reply and transmitting a clear to send in response to the request to send, wherein the request to send contains padding at the end of the request to send and before a frame check sequence.

A method of power management in a wireless device, the method comprising transmitting from a wireless device to a second wireless device, an initial frame having a single spatial stream and a low data rate, the second wireless device operating in a low power listening mode, the frame requesting a frame exchange with the second wireless device, the low data rate being lower than a maximum data rate of the second wireless device, receiving a reply to the initial frame from the second wireless device in the full capacity mode using a wider bandwidth than the low power listening mode, the reply acknowledging an association with the wireless device, and performing a frame exchange with the second wireless device in the full capacity mode.

In an embodiment transmitting the initial frame comprises transmitting the initial frame in a non-HT duplicate PPDU.

In an embodiment, the second wireless device switches from a low power listening mode before the end of the non-HT duplicate PPDU carrying the initial frame.

An embodiment includes the second wireless device indicating a padding requirement for the second wireless device to switch from a low power listening mode to a full capacity mode and wherein transmitting the initial frame comprises transmitting the initial frame with padding in response to the indicating the padding requirement.

An embodiment includes transmitting a request to send after transmitting the reply and receiving a clear to send in response to the request to send, wherein the request to send contains padding at the end of the request to send and before a frame check sequence.

An embodiment includes a wireless device including a processor and a transceiver coupled to the processor. The transceiver to transmit from a wireless device to a second wireless device, an initial frame having a single spatial stream and a low data rate, the second wireless device operating in a low power listening mode, the frame requesting a frame exchange with the second wireless device, the low data rate being lower than a maximum data rate of the second wireless device, to switch from the low power listening mode to a full capacity mode, to receive a reply to the initial frame from the second wireless device in the full capacity mode using a wider bandwidth than the low power listening mode, the reply acknowledging an association with the wireless device, and to perform a frame exchange with the second wireless device in the full capacity mode.

In an embodiment the transceiver transmits the initial frame by transmitting the initial frame in a non-HT duplicate PPDU.

In an embodiment, the second wireless device switches from a low power listening mode before the end of the non-HT duplicate PPDU carrying the initial frame.

An embodiment includes the second wireless device indicating a padding requirement to the second wireless device to switch from a low power listening mode to a full capacity mode and wherein transmitting the initial frame comprises transmitting the initial frame with padding in response to the indicating the padding requirement.

An embodiment includes transmitting a request to send after transmitting the reply and receiving a clear to send in response to the request to send, wherein the request to send contains padding at the end of the request to send and before a frame check sequence.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 8 depicts a process flow diagram of a low power listening mode for wireless communication in accordance with an embodiment of the invention.

Throughout the description, similar reference numbers may be used to identify similar elements

DETAILED DESCRIPTION

Figure 1:
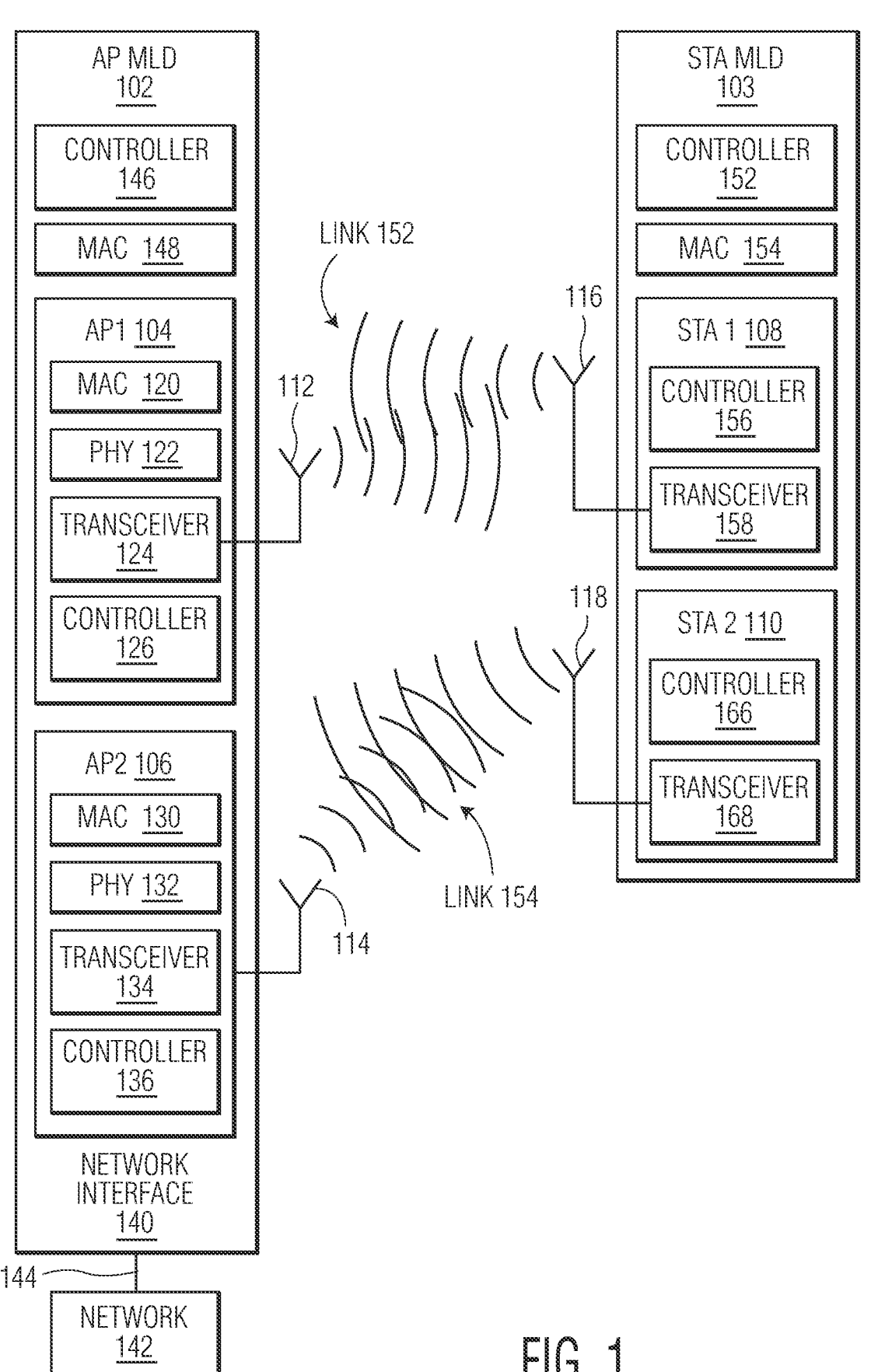
FIG. 1 depicts a multi-link communications system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

For any STA (Station), a low power consumption state is useful for saving power. For the AP this state is especially improved if it also includes low power listening modes that allow STAs to wake the AP. The low power listening mode uses less power also when a lower power data rate is used.

In one example low power listening mode, an AP uses only a single SS (Spatial Stream) to monitor the medium for any signals from another STA. The single SS may be over the whole operating BW (Bandwidth) or for lower power single SS may be over a smaller channel or subchannel, e.g., a 20 MHz primary channel. The AP may also operate in a lower value MCS (Modulation and Coding Scheme). The lower value MCS allows for a legacy type of PPDU (Physical Layer Protocol Data Unit). When the AP receives a first frame from a STA in a scheduled TXOP (Transmit Opportunity), then the AP may send a reply to complete the exchange and then revert back to a higher power consumption state, including the full capacity state to complete further frame exchanges with the STA. Any other STAs may also exchange frames with the AP in full power mode, e.g., an RTS (Request to Send) message or a CTS (Clear to Send) message.

The AP may announce the use of a low power listening mode and the announcement may include a designation of the SS and MCS, among other parameters. This allows STAs to transmit the initial PDPU, e.g., an RTS or MU-RTS, so that it is most likely to be successfully received at the STA.

FIG. 1 depicts a multi-link communications system that is used for wireless (e.g., WiFi) communications. In the embodiment depicted in FIG. 1, the multi-link communications system includes one AP multi-link device, which is implemented as AP MLD 102, and one non-AP STA multi-link device, which is implemented as STA MLD (non-AP MLD) 103. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with an IEEE 802.11bn protocol. Although the depicted multi-link communications system is shown in FIG. 1 with certain components and described with certain functionality herein, other embodiments of the multi-link communications system may include fewer or more components to implement the same, less, or more functionality. For example, in some embodiments, the multi-link communications system includes a single AP MLD and multiple associated STA MLDs, or multiple AP MLDs and multiple STA MLDs with each STA MLD being associated with an AP MLD. In some embodiments, the legacy STAs (non-HE STAs) associate with one of the APs affiliated with the AP MLD. In some embodiment an AP MLD may have a single affiliated AP. In some embodiment a STA MLD may have a single affiliated STA. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 102 includes a controller 146, a network interface 140, a common MAC 148, and two APs 104, 106 in two links 152, 154. In such an embodiment, the APs may be AP1 104 and AP2 106. In some embodiments, a common MAC 148 of the AP MLD 102 implements upper layer Media Access Control (MAC) functionalities (e.g., association establishment, reordering of frames, etc.) and a link specific part of the AP MLD 102, i.e., the APs 104 and 106, implement lower layer MAC functionalities (e.g., backoff, frame transmission, frame reception, etc.) in respective MAC devices 120, 130, PHY layer functionalities in PHY devices 122, 124, and radio functionalities in transceivers 124, 134. The APs 104 and 106 may be implemented in hardware (e.g., circuits), software, firmware, or a combination thereof. The APs 104 and 106 may be fully or partially implemented as an integrated circuit (IC) device. In some embodiments, the APs 104 and 106 may be wireless APs compatible with at least one WLAN communications protocol (e.g., at least one IEEE 802.11 protocol). For example, the APs 104 and 106 may be wireless APs compatible with the IEEE 802.11bn protocol.

In some embodiments, an AP MLD (e.g., AP MLD 102) connects to a local area network 142, e.g., a LAN, and/or to a backbone network, e.g., the Internet, through a wired connection 144 and wirelessly connects to wireless STAs, for example, through one or more WLAN communications protocols, such as an IEEE 802.11 protocol. In some embodiments, an AP, e.g., AP1 104 and/or AP2 106, includes multiple RF chains. In some embodiments, an AP, e.g., AP1 104 and/or AP2 106, includes at least one antenna 112, 114, at least one transceiver 124, 134 operably connected to the at least one antenna 112, 114, and at least one controller 126, 136 operably connected to the corresponding transceiver 124, 134. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 104 or 106 of the AP MLD 102 with multiple RF chains may operate in a different BSS (Basic Services Set) operating channel (in a different link). For example, AP1 104 may operate in a 320 MHz (BSS operating channel at 6 GHz band and AP2 106 may operate in a 160 MHz BSS operating channel at 5 GHz band. Although the AP MLD 102 is shown in FIG. 1 as including two APs, other embodiments of the AP MLD 102 may include more than two APs, or one AP only.

In the embodiment depicted in FIG. 1, the non-AP STA multi-link device, implemented as STA MLD 103, includes a common MAC 154, two non-AP STAs 108 and 110 in two links. In such an embodiment, the non-AP STAs may be STA1 108 and STA2 110. The STAs 108 and 110 may be implemented in hardware (e.g., circuits), software, firmware, or a combination thereof. The STAs 108 and 110 may be fully or partially implemented as an IC device. In some embodiments, the non-AP STAs 108 and 110 are part of the STA MLD 103, such that the STA MLD may be a communications device that wirelessly connects to a wireless AP MLD. For example, the STA MLD 103 may be implemented in a laptop, a desktop personal computer (PC), a mobile phone, or other communications device that supports at least one WLAN communications protocol. In some embodiments, the non-AP STA MLD 103 is a communications device compatible with at least one IEEE 802.11 protocol (e.g., an IEEE 802.11bn protocol, an IEEE 802.11be protocol, an IEEE 802.11ax protocol, or an IEEE 802.11ac protocol). In some embodiments, the STA MLD 103 implements a common MAC functionalities 154 and the non-AP STAs 108 and 110 implement a lower layer MAC data functionalities, PHY functionalities.

In some embodiments, the AP MLD 102 and/or the STA MLD 103 may identify which communication links support multi-link operation during a multi-link operation setup phase and/or exchanges information regarding multi-link capabilities during the multi-link operation setup phase. In some embodiments, each of the non-AP STAs 108 and 110 of the STA MLD 103 in different links may operate in a different frequency band. For example, the non-AP STA1 108 in one link may operate in the 2.4 GHz frequency band and the non-AP STA2 110 in another link may operate in the 5 GHz frequency band. In some embodiments, each STA includes at least one antenna 116, 118, at least one transceiver 158, 168 operably connected to the at least one antenna 115, 118, and at least one controller 156, 166 connected to the corresponding transceiver 158, 168. In some embodiments, at least one transceiver includes a PHY device (not shown). The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA MLD 103 communicates with the AP MLD 102 via two communication links, e.g., link 1 152 and link 2 154. For example, each of the non-AP STAs 108 or 110 communicates with an AP 104 or 106 via corresponding communication links 152 or 154. In an embodiment, a communication link (e.g., link 1 152 or link 2 154) may include a BSS operating channel established by an AP (e.g., AP1 104 or AP2 106) that features multiple 20 MHz channels used to transmit frames (e.g., Beacon frames, management frames, etc.) being carried in Physical Layer Convergence Protocol (PLCP) Protocol Data Units (PPDUs) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 103 is shown in FIG. 1 as including two non-AP STAs, other embodiments of the STA MLD 103 may include one non-AP STA or more than two non-AP STAs. In addition, although the AP MLD 102 communicates (e.g., wirelessly communicates) with the STA MLD 103 via multiple links 152 and 154, in other embodiments, the AP MLD 102 may communicate (e.g., wirelessly communicate) with the STA MLD 103 via more than two communication links or less than two communication links.

Different low power listening modes are described herein that include different features. These features may be combined from different low power listening modes, as described. The modes will be referred to as "1," "2," etc., however, the naming is not significant except for purposes of the present description.

STA's Low Power Listening Mode

In a STA low power listening mode, the STA monitors its operating BW. This may be either the full operating bandwidth or any selected 20 MHz channel. A single SS and low MCS are used to receive a legacy PPDU.

For an STA MLD (Multi-Link Device), the STA MLD is designated as having multiple STAs that may or may not share an antenna and other resources. Each STA may operate independently of the other STAs of the STA MLD and may independently enter a power saving mode, e.g., a dynamic power save mode. Each STA may be in full capacity mode, that is taken out of the Low Power Listening Mode, by an RTS or an MU-RTS received by the STA in a PPDU to initiate a new TXOP. For a non-HT duplicate PPDU, the mandatory data rate may be used as the low data rate. For other modes, e.g., UHR (Ultra High Reliability), HE (High Efficiency), and EHT (Extremely High Throughput), the PPDU may be in a single SS (Spatial Stream) with the mandatory MCS (Modulation and Coding Scheme).

Upon the STA receiving the initial RTS or MU-RTS, the STA replies with a CTS and the TXOP holder that sent the initial RTS or MU-RTS may use the STA's full capacity. This may include the full operating BW, NSS (Number of Spatial Streams), level of MCS, etc.

After some time, the STA returns to the low power listening mode. This return may be performed under appropriate circumstances for when the AP can use its full capacity and any of a variety of different options may be set by an administrator or initial configuration. In a first option, the STA returns at the end of the frame exchanges in accord with the dynamic SM power save rules. In a second option, the STA returns at the end of the frame exchanges in accord with the eMLSR (enhanced Multi-Link Single Radio) rules. In a first option, the STA returns at the end of the TXOP.

For a configuration in which the STA has negotiated TWT (Target Wake Time) SPs (Service Periods), whether individual TWT SPs or broadcast TWT SPs, the respective STA may be in a low power listening mode even during the TWT SPs. This maintains the power saving for a longer time. Alternatively, the STA may be in full capacity mode for each TWT SP before the TWT SP begins.

Figure 2:
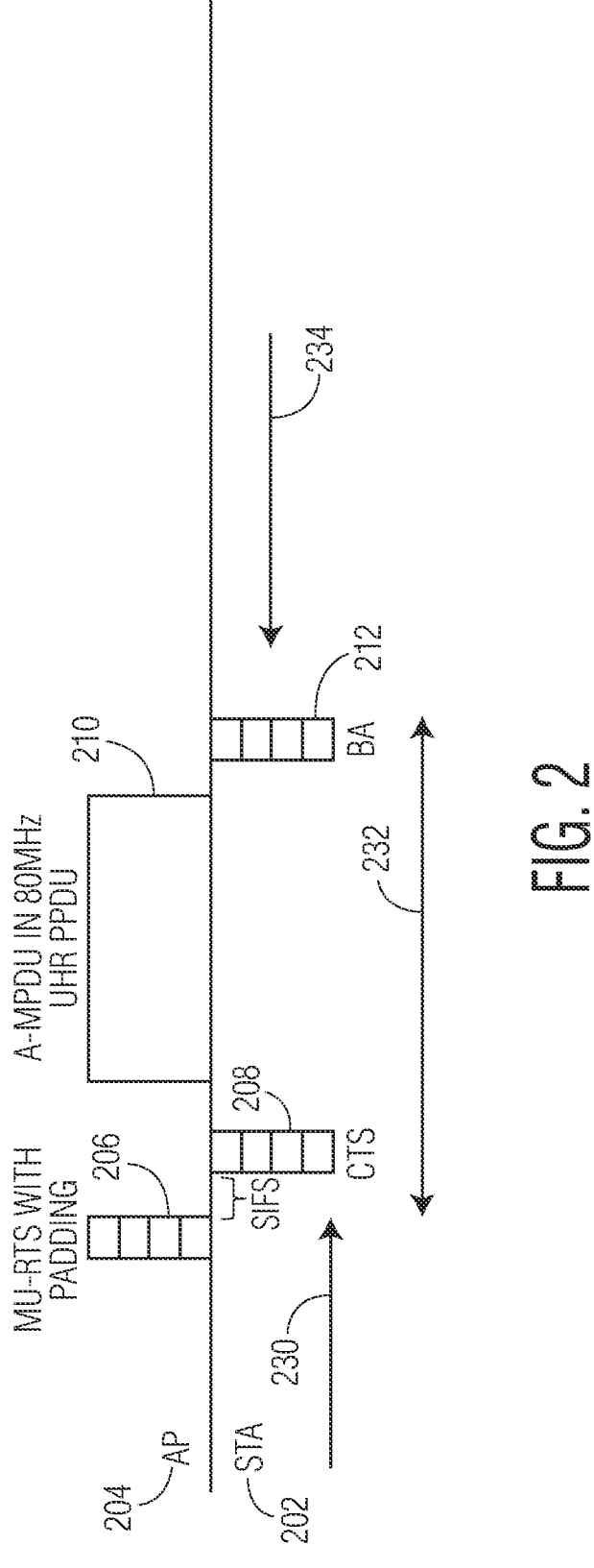
FIG. 2 depicts messages for operating a STA in a low power listening mode in accordance with an embodiment of the invention.

FIG. 2 depicts messages for operating a STA in a low power listening mode. A horizontal timeline proceeds from left to right with transmission from a STA 202 below the timeline and transmissions from an AP 204 above the timeline. The vertical extent of each transmission indicates the number of channels being used, e.g., 20 MHz channels. This example pertains to UHR (Ultra High Reliability) in which there is an MU-RTS (Multi-User Request to Send), then a CTS (Clear to Send) in response, then a wake and a wide BW A-MPDU (Aggregated MAC Protocol Data Unit). A successful A-MPDU is answered with a BA (Block Acknowledgement).

The sequence of FIG. 2 begins with an MU-RTS 206 transmitted by the AP 204 to multiple users, including the STA 202. In this example, the MU-RTS 206 is carried in a non-HT duplicate PPDU by using four 20 MHz channels indicated by the four blocks. The AP may accommodate the STAs to allow the STAs to switch from low power listening mode to full capacity mode by using padding in the initial MU-RTS 206 that initiates the frame exchange. The padding may follow the padding procedure defined by 802.11ax after User Info fields addressed to the STAs (User Info fields with Association Identifier (AID) values in the AID12 fields equal to the AIDs of the addressed STAs) in the initial MU-RTS 206. The STA 202 is in a low power listening mode for a start duration 230 and after the start duration the STA 202 switches to full capacity mode.

The STA 202 is listening in one of the 20 MHz channels in low power listening mode. After receiving the MU-RTS, the STA 202 tries to switch to full capacity mode and finishes the switch at the end of the MU-RTS with padding 206. The MU-RTS 206 is answered with a CTS 208 in full capacity whose BW is defined in MU-RTS (the maximal BW of the responding CTS is the same as the soliciting MU-RTS, in this example 80 MHz) from the STA 202 to the AP 204. In this example, for a low power listening mode, the STA 202 is listening in the low power listening mode for a start duration 230 that ends right after the reception of the MU-RTS 206. The STA 202 then enters a full capacity mode for a transmit/receive duration 232 until after sending the BA 212. After the BA 212, the AP returns to a low power listening mode for an end duration 234 which ends upon receiving the next MU-RTS or other message.

With static BW negotiation, the STA 202 responds to the MU-RTS 206 with the CTS 208 in a BW no wider than 80 MHz BW as defined in a User Info field for STA 202 under particular circumstances. First, if the BSS has four 20 MHz channels and the three 20 MHz channels other than the primary 20 MHz channel are idle within a SIFS between the MU-RTS and the CTS. The TXOP responder in this example is the STA 202 which may be listening in only a single 20 MHz channel. When the AP sends the MU-RTS 206 as a non-HT duplicate PPDU, the MU-RTS 206 may be received on multiple 20 MHz channels.

Figure 3:
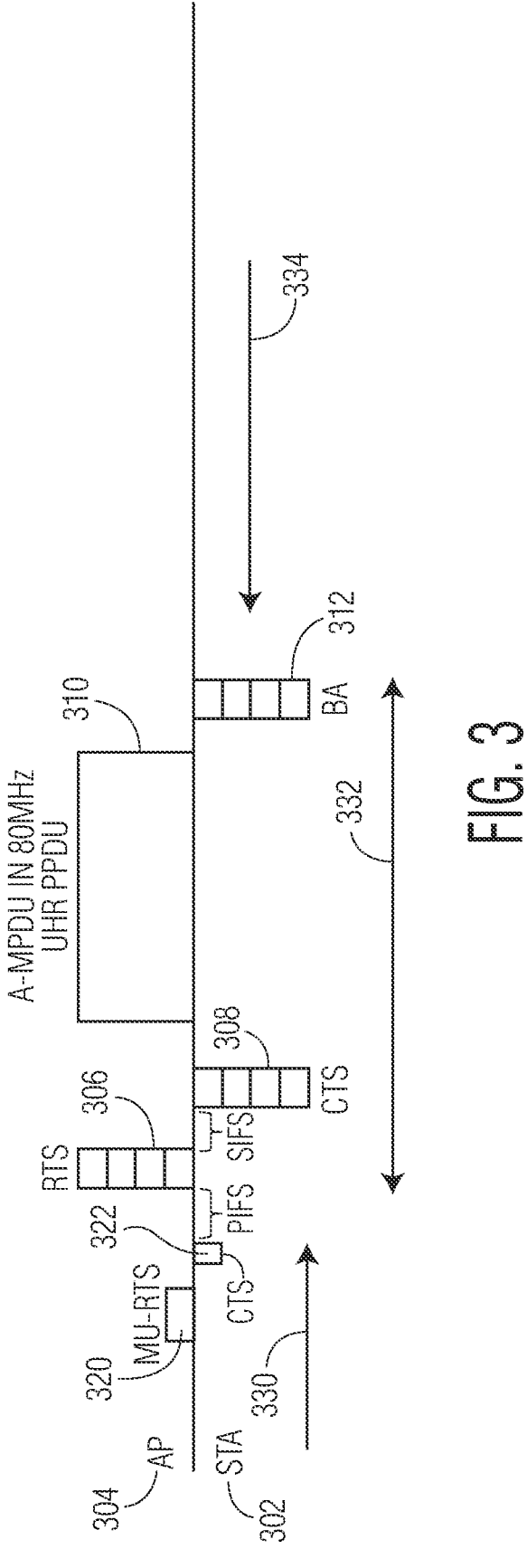
FIG. 3 depicts messages for operating a STA in a low power listening mode in accordance with an embodiment of the invention.

FIG. 3 depicts messages for operating a STA in a low power listening mode. A horizontal timeline proceeds from left to right with transmission from an AP 304 above the timeline and transmissions from a STA 202 below the timeline. The vertical extent of each transmission indicates the number of channels being used, e.g., 20 MHz channels. This example pertains to UHR (Ultra High Reliability) in which after the first 20 MHz MU-RTS/CTS there is an RTS (Request to Send), then a CTS (Clear to Send) in response, then a wake and a wide BW A-MPDU (Aggregated MAC Protocol Data Unit). A successful A-MPDU is answered with a BA (Block Acknowledgement).

However, in this example, the AP 304 sends the A-MPDU 310 and the RTS 306 in 80 MHz is preceded by a MU-RTS 320 in 20 MHz. In particular, after the first MU-RTS 320 in 20 MHz and CTS 322 in 20 MHz for STA 302 to switch from low power listening mode to full capacity mode, or it may be an RTS/CTS in 20 MHz for STA 302 to switch from low power listening mode to full capacity mode, the TXOP holder, in this case the AP 304, may transmit another RTS 306 and receive another CTS 308 to confirm that the wide BW is idle and that the wide BW can be used for the following frame exchanges, especially a UHR PPDU 310 and BA 312, within the TXOP. In this example, static or dynamic BW negotiation can be used in the frame exchange of RTS 306 and CTS 308.

As shown, the AP 304 sends an MU-RTS 320 in 20 MHz to multiple users including the STA 302. In one embodiment, the AP 304 acquires the medium with at least three idle 20 MHz channels other than the primary 20 MHz channel for a time duration of PIFS (Point Coordination Function (PCF) Interframe Space) before sending the MU-RTS 320. In another embodiment, the AP 304 acquires the medium with the primary 20 MHz channel. Alternatively, the AP 304 may send an RTS to STA 202 only. The STA 302 is in a low power listening mode for a start duration 330 and receives the MU-RTS 320 or RTS in a 20 MHz channel as was supported by low power listening mode. The STA is able to respond with a CTS 322 and then wakes to full power mode for a receive duration 332.

After the MU-RTS 320, the STA 302 may wait a time duration of SIFS before transmitting the CTS 322. The AP 304 may then allow some time for the STA 302 to fully wake to full bandwidth mode through the padding in MU-RTS 320 if required. The AP 304 may then send an RTS 306 in a wider BW, i.e. 80 MHz in the example. As shown the AP 304 waits for a PIFS after receiving the first CTS 322 before sending an RTS 306 in full BW mode. The PIFS before the RTS 306 is used by STA 202 to check the medium busy/idle of the three 20 MHz channels other than the primary 20 MHz channel. After a duration of a SIFS, the STA 302 in full capacity mode responds with a CTS 308 in 80 MHz. The AP 304 may then send an A-MPDU 310 in a UHR PPDU, e.g., an 80 MHz UHR PPDU. The STA 302 responds with a BA 312 and then returns to a low power listening mode for an end duration 334.

As in the example of FIG. 3, with static BW negotiation, the STA 302 responds to the RTS 306 with the CTS 308 in an 80 MHz BW under particular circumstances. First, if the RTS is transmitted in four 20 MHz channels and the three 20 MHz channels other than the primary 20 MH channel are idle within a PIFS before the RTS or within a SIFS between the RTS and the CTS in which case the SIFS instead of PIFS is used before the wide-BW RTS 306 is sent.

In another example, dynamic BW negotiation may be used. In this example, the STA 302 responds with the CTS 322 in the widest idle channel that includes primary 20 MHz channel. This may be a primary 20 MHz channel, a primary 40 MHz channel, or a primary 80 MHz channel. The CTS is sent after performing a CCA (Clear Channel Assessment not shown) and within a PIFS before the wide-BW RTS 306 or within a SIFS between the RTS and the CTS in which case the SIFS instead of PIFS is used before the wide-BW RTS 306 is sent.

Figure 4:
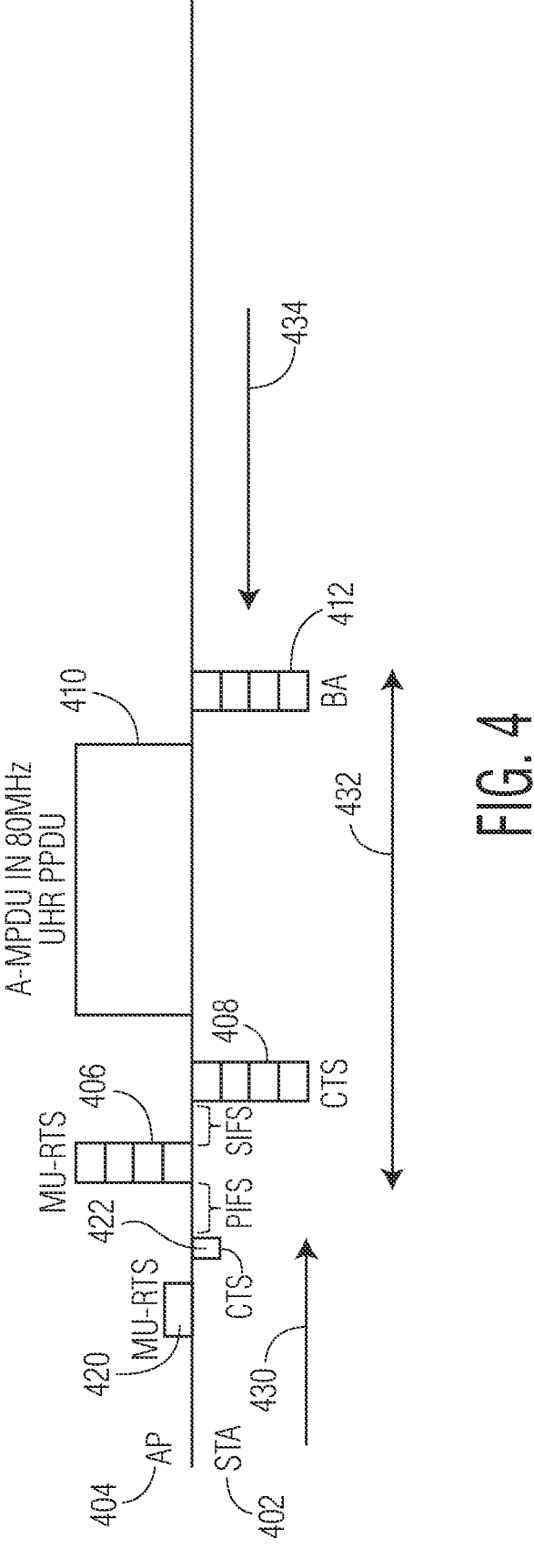
FIG. 4 depicts messages for operating a STA in a low power listening mode in accordance with an embodiment of the invention.

FIG. 4 depicts messages for operating a STA in a low power listening mode. A horizontal timeline proceeding from left to right with transmission from an AP 204 above the timeline and transmissions from a STA 202 below the timeline. The vertical extent of each transmission indicates the number of channels being used, e.g., 20 MHz channels. This example is similar to the example of FIG. 3, except that the AP 404 transmits a wide BW MU-RTS 406 after waiting a time duration of a SIFS after receiving a 20 MHz CTS 422 from the STA 402. The second MU-RTS 406 and CTS 408 may be used to confirm the wider BW being used for the following frame exchanges within the TXOP.

After a first MU-RTS 420 and CTS 422 while the STA 420 is in a low power listening mode for a start duration 430, the TXOP holder, in this case the AP 404, may transmit another MU-RTS 406 to the STA 402. The TXOP holder, e.g., the AP 404, further decides whether the 80 MHz channel is idle within PIFS after receiving the first CTS 422 before transmitting the wide BW MU-RTS 406. The AP 404 then receives a wide BW CTS 408 from the STA 402 to confirm that the wider BW is being used for the following frame exchanges, especially a UHR PPDU 410 and BA 412, within the TXOP. Here the UHR PPDU 410 is an 80 MHz PPDU in accord with the 80 MHz MU-RTS 406 and CTS 408.

The frame exchanges in support of a STA low power listening mode may be expressed as a method in which the STA, as a second wireless device, receives from an AP, as first wireless device, an initial frame, e.g., a MU-RTS, RTS, or Probe Request, having a single spatial stream and a low data rate. The low data rate is lower than a maximum data rate of the STA. The STA is operating in a low power listening mode. The frame requests a frame exchange with the STA. The STA transmits a reply, e.g., a MU-CTS, CTS, or Probe Response, to the initial frame from the AP in a single spatial stream with the low data rate. The reply acknowledges an association with the AP. A frame exchange may then be performed with the AP in the full capacity mode.

The STA can indicate a padding requirement to the AP that provides the time that is required for the STA to switch from the low power listening mode to the full capacity mode. The initial frame from the AP may be received with padding in response to the indicating the padding requirement. The padding at the end of the request to send and before a frame check sequence. This is MAC level padding. The padding may instead, or in addition, be as an extension of the initial frame. This is PHY level padding. The total padding is at least as long as the padding requirement indicated by the STA for its BW switch buy may be longer.

As described above the 20 MHz RTS/CTS frame exchange and the subsequent wide BW frame exchange have a longer inter-frame space, e.g., PIFS, for BW negotiation. To facilitate reliability, the AP or the STA which is operating using a low power listening mode may announce the time required to switch from a narrower band, e.g., 20 MHz to a wider BW, e.g., 160 MHz. The announcement can be in the Action frame for enabling the low power listening mode, during the association through Association Request/ Response, Beacon etc.

AP Low Power Listening Mode 1

In a first low power listening mode, referred to herein as Low Power Listening Mode 1, the AP monitors its operating bandwidth (BW). This may be either the full operating BW or any selected 20 MHz channel. As single SS and low MCS are used to receive a legacy PPDU. The AP receives PPDUs such as an RTS or other message in the operating BW on a single SS and with the announced low data rate. Any AP of an AP MLD in dynamic power save mode may further save power through using the Low Power Listening Mode 2.

Each AP may switch from low power listening mode to full capacity mode by an RTS or an MU-RTS received by the AP to initiate a new TXOP. For a non-HT (duplicate) PPDU, the mandatory data rate may be used as the low data rate. For other modes, e.g., UHR, HE, and EHT, the PPDU may be in a single SS with the mandatory MCS.

For enhanced power saving based on low power listening mode, the AP is only monitoring the one announced 20 MHz channel. When this 20 MHz channel is not the primary 20 MHz channel, then the AP may check the announced 20 MHz channel using medium idle checking within a SIFS (Short Idle Frame Space). After the frame exchange then wider BW PPDU transmissions by using AP's full capacity are allowed within the TXOP and the usage of AP's full capacity mode is ended until the end of the TXOP.

After the first (MU-)RTS/CTS exchange (or after the reception of the first initiating MU-RTS/RTS) and the AP is back to full capacity. This may include the full operating BW, NSS (Number of Spatial Streams), level of MCS, etc. The TXOP holder may transmit another RTS/CTS to confirm the wider BW being used for the subsequent frame exchanges within the TXOP if the first (MU-) RTS/CTS exchange uses 20 MHz. Either a static or a dynamic BW negotiation can be used.

After some time, the AP returns to the low power listening mode, e.g., Low Power Listening Mode 1. This return may be performed under appropriate circumstances and any of a variety of different options may be set by an administrator or initial configuration. In a first option, the AP returns at the end of the frame exchanges in accord with the dynamic SM power save rules. In a second option, the AP returns at the end of the frame exchanges in accord with the eMLSR rule.

Figure 5:
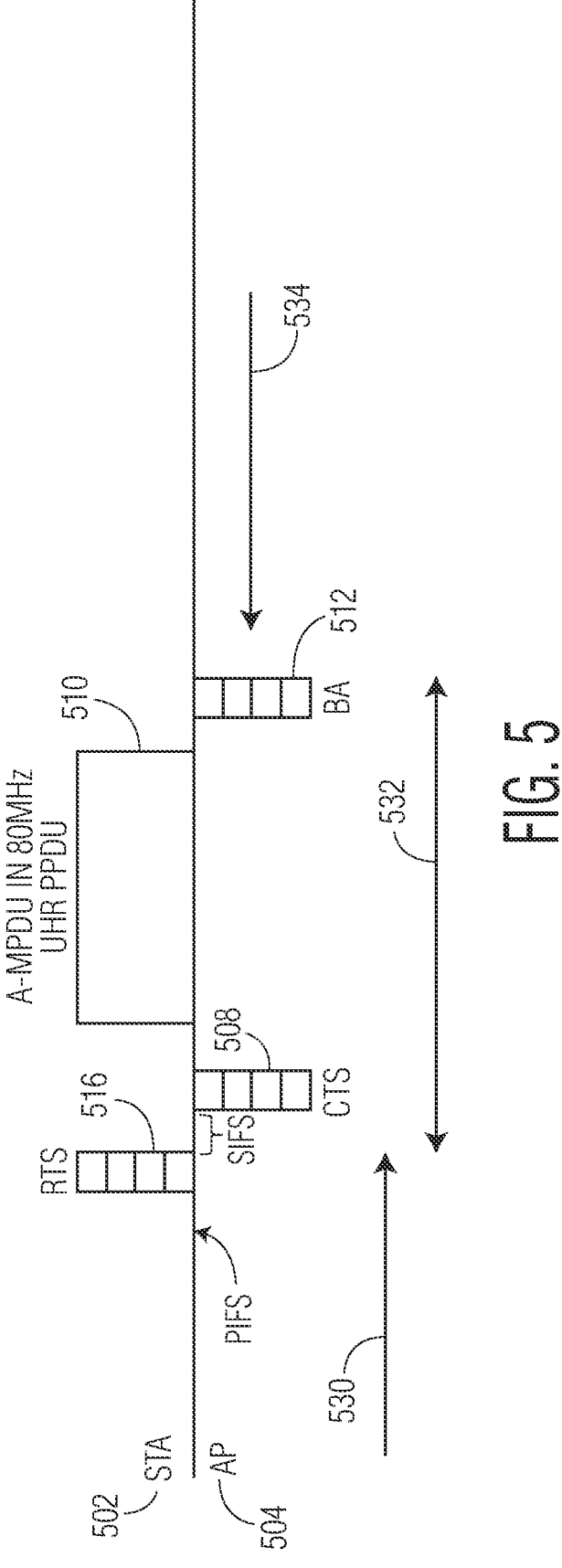
FIG. 5 depicts messages for operating an AP in a first low power listening mode in accordance with an embodiment of the invention.

FIG. 5 depicts messages for operating an AP in a first low power listening mode. A horizontal timeline proceeding from left to right with transmission from a STA 502 above the timeline and transmissions from an AP 504 below the timeline. The vertical extent of each transmission indicates the number of channels being used, e.g., 20 MHz channels. This example pertains to UHR (Ultra High Reliability) in which there is an (MU-)RTS 516 (Request to Send) with a switching from low power listening mode to full capacity mode during the reception of (MU-)RTS, then a CTS 508 (Clear to Send) in response, and a wide BW A-MPDU 510 (Aggregated MAC Protocol Data Unit). A successful A-MPDU 510 is answered with a BA 512 (Block Acknowledgement).

The sequence of FIG. 5 begins with an (MU-)RTS 516 transmitted by the STA 502 to the AP 504. In this example, the (MU-)RTS 516 is in a non-HT duplicate PPDU with four 20 MHz channels indicated by the four blocks. The AP 504 is listening in one of the 20 MHz channels in low power listening mode. During the reception and processing of the (MU-)RTS, the AP switches from low power listening mode to full capacity mode and such switching is done before the end of the PPDU carrying (MU-)RTS 516. The (MU-)RTS 516 is answered with a CTS 508 from the AP 504 in full capacity mode to the STA 502. In this example, for a low power listening mode, the AP is listening in the low power listening mode for a start duration 530 that ends after the PPDU carrying the (MU-)RTS 516. The AP 504 then enters a full capacity mode for a transmit/receive duration 532 until after sending the BA 512. After the BA, the AP returns to a low power listening mode for an end duration 534 which ends upon receiving the next RTS or other message.

With static BW negotiation, the AP 504 responds to the (MU-)RTS 516 with the CTS 508 in an 80 MHz BW that is the same as the BW of the (MU-) RTS 516 under particular circumstances. First, if the BSS has four 20 MHz channels and the three 20 MHz channels other than the primary 20 MH channel are idle within a SIFS between the RTS 516 and the CTS 508.

In another example, with dynamic BW negotiation, the AP 504 responds to the (MU-)RTS 516 with a CTS 508 in the widest idle channel. This may be a primary 20 MHz channel, a primary 40 MHz channel, or a primary 80 MHz channel. The CTS is sent after performing a CCA (Clear Channel Assessment not shown) within a SIFS between RTS 516 and CTS 508. Upon detecting the MU-RTS 516 in a 20 MHz channel, the TXOP holder, i.e., the AP, can do a CCA with a wide BW within the time of a SIFS after the MU-RTS 506 before transmitting the CTS 508. In other circumstances no CCA is required, e.g., if the soliciting frame 516 is a BSRP (Buffer Status Report Poll) Trigger to solicit a QoS (Quality of Service) Null in a TB (TraceBack) PPDU.

AP Low Power Listening Mode 2

In a second low power listening mode, referred to herein as Low Power Listening Mode 2, the AP monitors an announced 20 MHz channel, e.g., a primary 20 MHz channel instead of the whole operating BW. The AP receives PPDUs such as an RTS or other message in the 20 MHz channel on a single SS and with the announced low data rate. Any AP of an AP MLD in dynamic power save mode may further save power through using the Low Power Listening Mode 2.

Each AP may switch from low power listening mode to full capacity mode by an RTS or an MU-RTS received by the AP to initiate a new TXOP. In this mode the PPDU is a 20 MHz PPDU or a non-HT duplicate PPDU. For a non-HT (duplicate) PPDU, the mandatory data rate may be used as the low data rate. For other modes, e.g., UHR, HE, and EHT, the PPDU may be in a single SS with the mandatory MCS.

For enhanced power saving based on low power listening mode, the AP is only monitoring the one announced 20 MHz channel. When this 20 MHz channel is not the primary 20 MHz channel, then the AP may check the announced 20 MHz channel using medium idle checking within a SIFS (Short Idle Frame Space). After the frame exchange then wider BW PPDU transmissions by using AP's full capacity are allowed within the TXOP and the usage of AP's full capacity mode is ended until the end of the TXOP.

After the first (MU-)RTS/CTS exchange (or after the reception of the first initiating MU-RTS/RTS) and the AP is back to full capacity, the TXOP holder may transmit another RTS/CTS to confirm the wider BW being used for the subsequent frame exchanges within the TXOP if the first (MU-)RTS/CTS exchange uses 20 MHz. Either a static or a dynamic BW negotiation can be used. The AP switches back to Low Power Listening Mode 2 as described above for Low Power Listening Mode 1.

Figure 6:
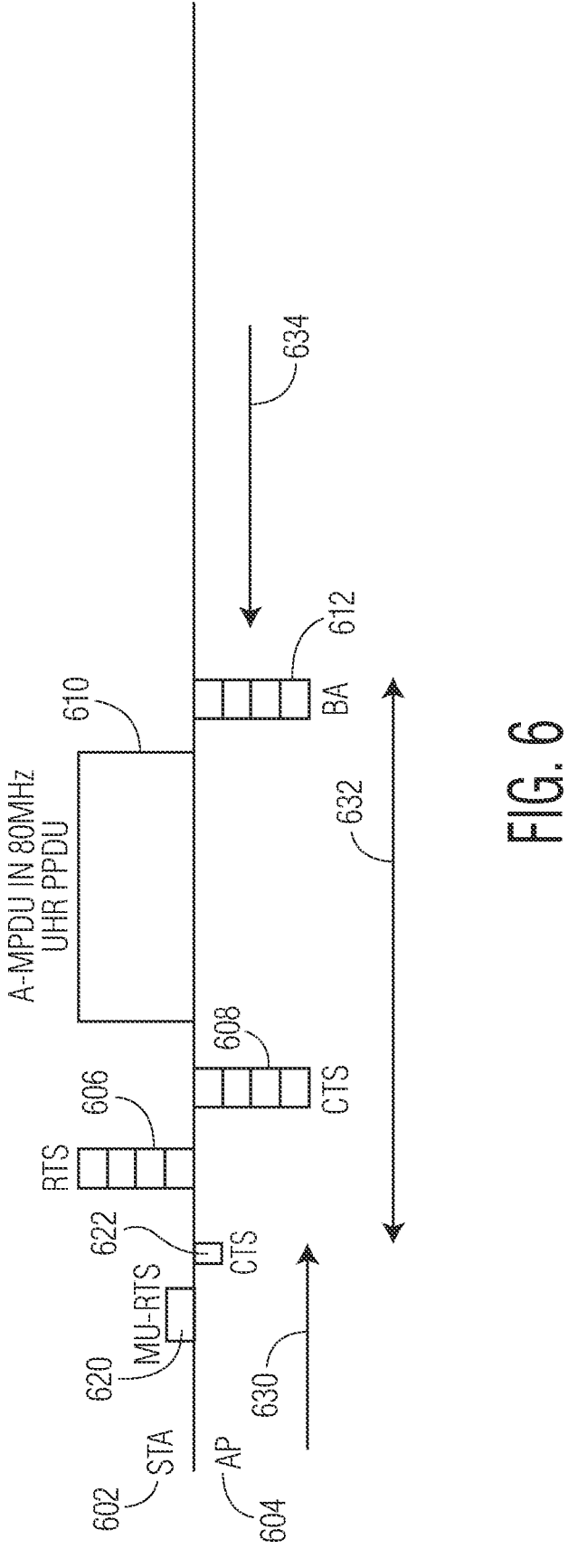
FIG. 6 depicts messages for operating an AP in a second low power listening mode in accordance with an embodiment of the invention.

FIG. 6 depicts messages for operating an AP in a second low power listening mode. A horizontal timeline proceeds from left to right with transmission from a STA 602 above the timeline and transmissions from an AP 504 below the timeline. The vertical extent of each transmission indicates the number of channels being used, e.g., 20 MHz channels. This example also pertains to UHR (Ultra High Reliability) in which there is an RTS (Request to Send), then a CTS (Clear to Send) in response. In this example, the STA 602 sends the A-MPDU 610 and the RTS 606 is preceded by a MU-RTS 620 from the STA 602. In particular, after the first MU-RTS 620 and CTS 622, the TXOP holder, in this case the STA 602 may transmit another RTS 606 and receive another CTS 608 to confirm that the wider BW is being used for the following frame exchanges, especially a UHR PPDU 610 and BA 612, within the TXOP.

The STA 602 acquires the medium with at least three idle 20 MHz channels other than the primary 20 MHz channel for a time duration of PIFS before sending the MU-RTS 620. The AP 604 is in a low power listening mode for a start duration 630 and receives the MU-RTS 620 in a 20 MHz channel as was previously negotiated. The AP 604 is able to respond with a CTS 622 and then wakes to full capacity mode for a receive duration 632. After the MU-RTS 620, the AP 604 may wait a time duration of SIFS before transmitting the CTS 622. The STA 602 may then send an RTS 606 in 80 MHz in full capacity mode. After a duration of a SIFS, the AP 604 responds with a CTS 608 in full BW mode. The STA may then send an A-MPDU in a UHR PPDU, e.g., an 80 MHz UHR PPDU. The AP responds with a BA 612 and then returns to a low power listening mode for an end duration 634.

As in the example of FIG. 5, with static BW negotiation, the AP 604 responds to the RTS 606 with the CTS 608 in an 80 MHz BW under particular circumstances. First, if the BSS has four 20 MHz channels and the three 20 MHz channels other than the primary 20 MH channel are idle within a PIFS before the RTS or within a SIFS between the RTS and the CTS.

In another example, with static BW negotiation, the AP 604 responds with the CTS 622 in the widest idle channel. This may be a primary 20 MHz channel, a primary 40 MHz channel, or a primary 80 MHz channel. The CTS is sent after performing a CCA (not shown) and within a PIFS before the wide-BW RTS 606 or within a SIFS between the RTS 606 and the CTS 608.

In some examples, a STA or an AP STA may need more time (mode switch time) than the received initial frame to change from a low power listening mode to a full capacity mode. The STA/AP may then announce an indication of the time that it requires to change its lower power listening mode to full capacity mode. The mode switch time can be announced in Beacon, Probe Request/Response, Association Request/Response frame. In one example the TXOP holder will be at full capacity mode after receiving the initial frame with the padding where the padding bits are long enough to cover the mode switch time. In this example at the end of the PPDU carrying the first MU-RTS frame and the padding in the MU-RTS frame, the TXOP responder finishes its switch from low power listening mode to full capacity mode. In another example the TXOP holder will be at full capacity mode after the first frame exchange (RTS/CTS or MU-RTS/CTS). The SIFS before the CTS and the time to transmit the CTS cover the mode switch time. In this example at the end of the PPDU carrying the CTS frame, the TXOP responder finishes its switch from low power listening mode to full capacity mode.

In one example the TXOP holder will be at full capacity mode after receiving the initial frame with the padding where the padding bits are long enough to cover the mode switch time. In this example at the end of the PPDU carrying the first MU-RTS frame and the padding in the MU-RTS frame, the TXOP responder finishes its switch from low power listening mode to full capacity mode. In another example the TXOP holder will be at full capacity mode after the first frame exchange (RTS/CTS or MU-RTS/CTS) where the SIFS before CTS and the time to transmit the CTS cover the mode switch time. In this example at the end of the PPDU carrying the CTS frame, the TXOP responder finishes its switch from low power listening mode to full capacity mode.

In some examples, an enhanced MU-RTS and CTS is used for BW negotiation and to prepare for full capacity transmission/reception. The MU-RTS is enhanced in that it carries padding. The additional time required for mode switch may be added by the TXOP holder in the first initiating control frame, as mentioned above, to allow time for the TXOP responder to switch from a low power listening mode to a full capacity receive and transmit mode.

The additional time required for mode switch may be in the form of additional frames, as mentioned above, e.g. (MU-)RTS/CTS in 20 MHz.

AP's Low Power Listening Mode and Association, Probing

Figure 7:
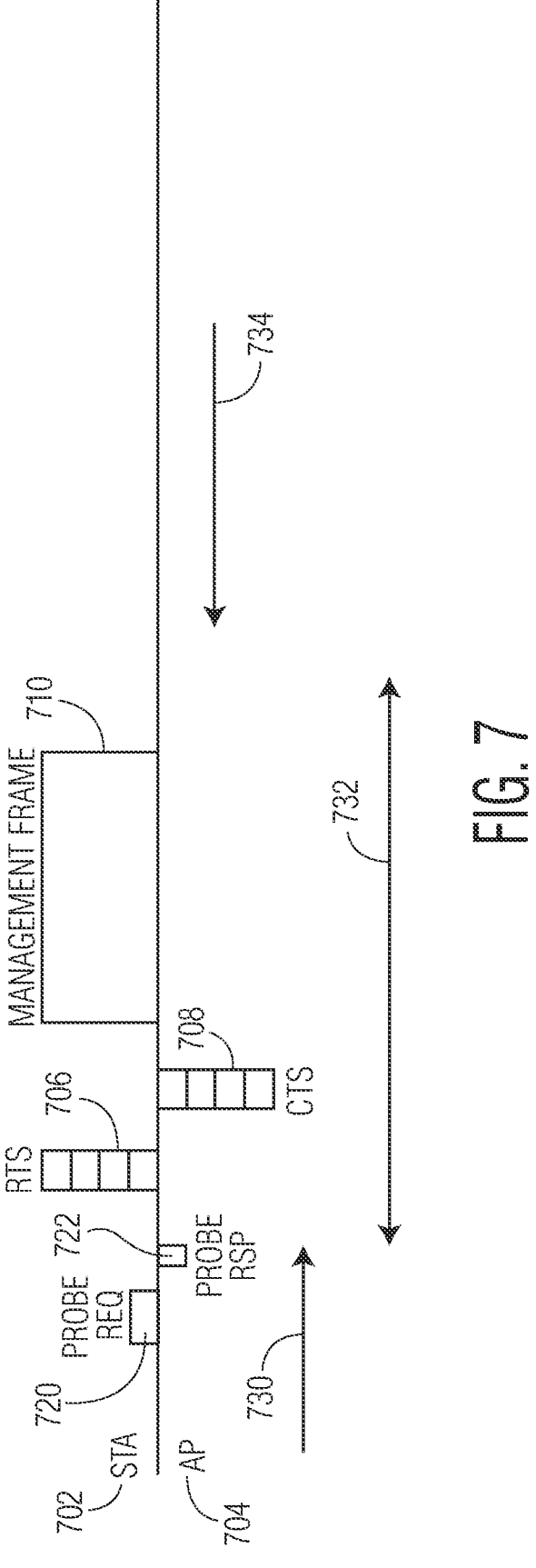
FIG. 7 depicts messages for operating an AP in a low power listening mode with Probe Request frames in accordance with an embodiment of the invention.

FIG. 7 depicts messages for operating an AP in a low power listening mode using Probe Request frames. This is another association of a STA with an AP. The above examples describe circumstances when an AP receives an RTS or MU-RTS. In other circumstances, an AP 704 in a low power listening mode 730 receives a Probe Request frame 720 from a STA 702. The AP 704 is to respond to the Probe Request frame 720 with a Probe Response frame 722. When the AP 704 transmits the Probe Response frame 722, the AP 704 may also switch from the low power listening mode 730 to a full capacity mode 732 for the subsequent association procedure. The nature of the full function mode may be adapted to different circumstances. The full function mode has at least more than one single SS on the medium.

Instead of responding to a Probe Request frame, an AP 704 that is in a low power listening mode 730 can announce that it requires an RTS 706 or MU-RTS instead. This may apply to all Probe Request frames or just to some possible Probe Request frames. As an example, an unassociated UHR STA 702 may be required to first transmit an RTS 706 or MU-RTS in a PPDU. The unassociated UHR STA 702 then receives a CTS 708 from the AP 704 and after receiving the CTS 708 from the AP 704 is permitted to transmit a frame 710 to the AP 704 for authentication, association, and key negotiation, etc. After the UHR STA is associated, then the process may be as otherwise described for a Probe Request. The AP 704 may return to a low power listening mode 734 or a frame exchange may be initiated with the STA 702.

The AP may indicate in the Probe Response frame that it will switch to a full function mode. Alternatively, the AP may indicate in the Probe Response frame that it will stay in the low power listening mode for any potential subsequent association procedure.

After a non-AP STA sends the Probe Request frame, then it may receive the Probe Response frame indicating that the AP will stay in low power listening mode. The non-AP STA may transmit management frames (e.g., authentication request, association request frame) for the potential association procedure using the 20 MHz channel of the low power listening mode. The transmission may also comply with the other parameters of the low power listening mode, e.g., a single spatial stream, a low MCS or data rate, or a 20 MHz legacy PPDU with mandatory data rate.

When the AP in low power listening mode receives the request frame for association, e.g., an Association Request, the AP may switch to a full function mode or stay in the low power listening mode. In the first case, the AP can switch to an active mode for its own response frame transmission, e.g., an Association Response. In the second case, the AP can stay in the low power listening mode for its response frame transmission. In either case, the AP may indicate in the Association Response frame whether it will switch to full capacity mode or stay in the low power listening mode after the association is accomplished.

At times an AP in low power listening mode may not be able to decode a received PPDU from an unassociated STA with a BW>20 MHz. This may also occur when the Color field in the PHY header is able to be decoded. The AP may take different measures to solve this problem. In some examples, the AP may switch from the low power listening mode to an active mode. The AP may use the active mode for potential probing, authentication, and association.

An unassociated UHR STA may use a 20 MHz BW and 1SS PPDU for the association even when the AP is in a low power listening mode. In order to use more BW, the unassociated UHR STA may transmit an RTS or MU-RTS. After receiving a suitable CTS frame from the AP in a frame exchange, the STA may then transmit a PPDU using more than one SS in the new association. For a STA that is not operating in UHR, more than one SS may be used for its association frame exchange.

AP's Low Power Listening Mode Enabling or Not

For an AP that accepts an association from an HE STA, the AP can enable its own low power listening mode. In such a scenario, the low power listening mode may be ended at the start of frame exchanges in response to a RTS or Probe Request. The AP operates at a full capacity mode during the subsequent frame exchanges and then returns to the low power listening mode at the end of the TXOP.

In another example, an AP may be configured to accepts associations from UHR STAs that support the AP's low power listening mode. For such UHR STAs, the AP may also enable its own low power listening mode.

As mentioned above, in these and other configurations, the AP may announce whether the AP operates in low power listening mode or not. The announcement may be in a broadcast management frame, e.g., a Beacon Frame, Probe Response Frame, etc.

FIG. 8 is a process flow diagram of a method for wireless communications in accordance with an embodiment of the invention. At block 802, the first wireless device performs announcing that the first wireless device is operating in a low power listening mode. At block 804 the first wireless device performs receiving, in the low power listening mode, an initial frame from a second wireless device. The initial frame has a single spatial stream and a low data rate. The initial frame is requesting a frame exchange with the first wireless device. The low data rate is lower than a maximum data rate of the first wireless device.

At block 806 the first wireless device performs transmitting a reply to the initial frame to the second wireless device in a single spatial stream with the decreased data rate, the reply acknowledging an association with the second wireless device. At block 808, the first wireless device performs waking from the low power listening mode to a full capacity mode, and at block 810 a frame exchange is performed with the second wireless device in the full capacity mode.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of power management in a first wireless device, the method comprising:

announcing, by the first wireless device, that the first wireless device is operating in a low power listening mode;

receiving, by the first wireless device in the low power listening mode, an initial frame having a single spatial stream and a low data rate from a second wireless device, the frame requesting a frame exchange with the first wireless device, the low data rate being lower than a maximum data rate of the first wireless device;

transmitting a reply to the initial frame to the second wireless device in a single spatial stream with the low data rate, the reply acknowledging an association with the second wireless device;

waking from the low power listening mode to a full capacity mode; and performing a frame exchange with the second wireless device in the full capacity mode.

2. The method of claim 1, wherein receiving the initial frame comprises receiving the initial frame in the full capacity mode of the first wireless device.

3. The method of claim 2, wherein the full capacity mode has an operating bandwidth that comprises a basic service set of a frequency band.

4. The method of claim 1, wherein receiving the initial frame comprises receiving the initial frame in a single channel of an operating bandwidth of the first wireless device and wherein transmitting the reply comprises transmitting the reply in the single channel.

5. The method of claim 4, wherein the single channel is a 20 MHz channel of a basic service set of a frequency band.

6. The method of claim 1, wherein performing a frame exchange comprises transmitting a frame using multiple spatial streams and a high data rate, the high data rate being higher than the low data rate.

7. The method of claim 1, wherein receiving the initial frame comprises receiving a non-HT (High Throughput) duplicate PPDU (Physical Layer Protocol Data Unit) of a transmit opportunity in greater than a single 20 MHz channel.

8. The method of claim 7, wherein the initial frame comprises a request to send and the reply to the initial frame comprises a clear to send.

9. The method of claim 8, further comprising:

receiving, by the first device in the full capacity mode, a second PPDU having a request to send from the second wireless device; and transmitting a reply to the second PPDU to the second wireless device in the full capacity mode having a clear to send.

10. The method of claim 7, wherein the initial frame comprises a probe request frame and the reply to the initial frame comprises a probe response frame.

11. The method of claim 7, wherein the initial frame comprises a multi-user request to send and the reply to the initial frame comprises a clear to send.

12. The method of claim 1, further comprising returning to the low power listening mode after performing the frame exchange.

13. The method of claim 1, wherein announcing comprises announcing parameters of the low power listening mode and wherein receiving the initial frame comprises receiving the initial frame in accordance with the parameters.

14. A wireless device comprising:

a processor; and a transceiver coupled to the processor, the transceiver to announce that the wireless device is operating in a low power listening mode, to receive, in the low power listening mode, an initial frame having a single spatial stream and a low data rate from a second wireless device, the frame requesting a frame exchange with the wireless device, the low data rate being lower than a maximum data rate of the wireless device, to transmit a reply to the initial frame to the second wireless device in a single spatial stream with the low data rate, the reply acknowledging an association with the second wireless device, the processor to wake the wireless device from the low power listening mode to a full capacity mode, and the transceiver to perform a frame exchange with the second wireless device in the full capacity mode.

15. The wireless device of claim 14, wherein the transceiver is to receive the initial frame in a single channel of an operating bandwidth of the wireless device and to transmit the reply in the single channel.

16. A method of power management in a second wireless device, the method comprising:

receiving an announcement, by a first wireless device, that the first wireless device is operating in a low power listening mode;

transmitting, by the second wireless device, an initial frame having a single spatial stream and a low data rate to the first wireless device, the frame requesting a frame exchange with the first wireless device, the low data rate being lower than a maximum data rate of the first wireless device;

receiving a reply to the initial frame from the first wireless device in a single spatial stream with the low data rate, the reply acknowledging an association with the second wireless device; and performing a frame exchange with the first wireless device in a full capacity mode.

17. A method of power management in a second wireless device, the method comprising:

receiving from a first wireless device at a second wireless device, an initial frame having a single spatial stream and a low data rate, the second wireless device operating in a low power listening mode, the frame requesting a frame exchange with the second wireless device, the low data rate being lower than a maximum data rate of the second wireless device;

switching from the low power listening mode to a full capacity mode;

transmitting a reply to the initial frame from the first wireless device in the full capacity mode using a wider bandwidth than received in the low power listening mode, the reply acknowledging an association with the first wireless device; and performing a frame exchange with the first wireless device in the full capacity mode.

18. The method of claim 17, wherein receiving the initial frame comprises receiving the initial frame in a non-HT duplicate PPDU and wherein switching comprises switching before the end of the non-HT duplicate PPDU carrying the initial frame.

19. The method of claim 18, further comprising the second wireless device indicating a padding requirement to the first wireless device for the second wireless device to switch from the low power listening mode to the full capacity mode and wherein receiving the initial frame comprises receiving the initial frame with padding in response to the indicating the padding requirement.

20. The method of claim 17, further comprising receiving a request to send after transmitting the reply and transmitting a clear to send in response to the request to send, wherein the request to send contains padding at the end of the request to send and before a frame check sequence.

21. A method of power management in a wireless device, the method comprising:

transmitting from a wireless device to a second wireless device, an initial frame having a single spatial stream and a low data rate, the second wireless device operating in a low power listening mode, the frame requesting a frame exchange with the second wireless device, the low data rate being lower than a maximum data rate of the second wireless device;

receiving a reply to the initial frame from the second wireless device in the full capacity mode using a wider bandwidth than the low power listening mode, the reply acknowledging an association with the wireless device; and performing a frame exchange with the second wireless device in the full capacity mode.

22. The method of claim 21, wherein transmitting the initial frame comprises transmitting the initial frame in a non-HT duplicate PPDU and wherein the second wireless device switches from a low power listening mode before the end of the non-HT duplicate PPDU carrying the initial frame.

23. The method of claim 21, the second wireless device indicating a padding requirement for the second wireless device to switch from a low power listening mode to a full capacity mode and wherein transmitting the initial frame comprises transmitting the initial frame with padding in response to the indicating the padding requirement.

* * * * *